United States Patent [19]

Van Gerpen

[11] E Re. 29,673

[45] Reissued Jun. 20, 1978

[54] DEMAND COMPENSATED HYDRAULIC SYSTEM WITH PILOT LINE DITHER

[75] Inventor: Harlan Welbert Van Gerpen, Cedar Falls, Iowa

[73] Assignee: Deere & Company, Moline, Ill.

[21] Appl. No.: 809,564

[22] Filed: Jun. 24, 1977

Related U.S. Patent Documents

Reissue of:

[64] Patent No.: 3,973,399
Issued: Aug. 10, 1976
Appl. No.: 644,883
Filed: Dec. 29, 1975

[51] Int. Cl.[2] ..... F16H 39/46

[52] U.S. Cl. ..... 60/445; 60/451; 60/484; 91/429; 417/212

[58] Field of Search ..... 60/391, 420, 422, 427, 60/445, 451, 484; 417/212; 91/429

[56] References Cited

U.S. PATENT DOCUMENTS

| | | | |
|---|---|---|---|
| 2,743,582 | 5/1956 | Wiedmann | 60/389 |
| 2,892,311 | 6/1959 | Van Gerpen | 60/422 |
| 2,892,312 | 6/1959 | Allen et al. | 60/427 |
| 3,754,400 | 8/1973 | Parquet | 60/445 |
| 3,826,090 | 7/1974 | Bahl | 60/445 |

*Primary Examiner*—Edgar W. Geoghegan

[57] ABSTRACT

A demand compensated hydraulic system includes a pump responsive to a pressurized fluid in a demand feedback pilot line. The pilot line is connected to sense fluid demand between a hydraulic motor and an associated control valve which is closed by servo feedback from the motor. A dither is connected to the pilot line to continuously oscillate the pressurized fluid in the pilot line to prevent the occurrence of a situation wherein the flow across the control valve is sufficient to prevent the pump from going to a stand-by condition while being insufficient to operate the motor to close the valve to thereby cause the pump to go into the standby condition.

6 Claims, 1 Drawing Figure

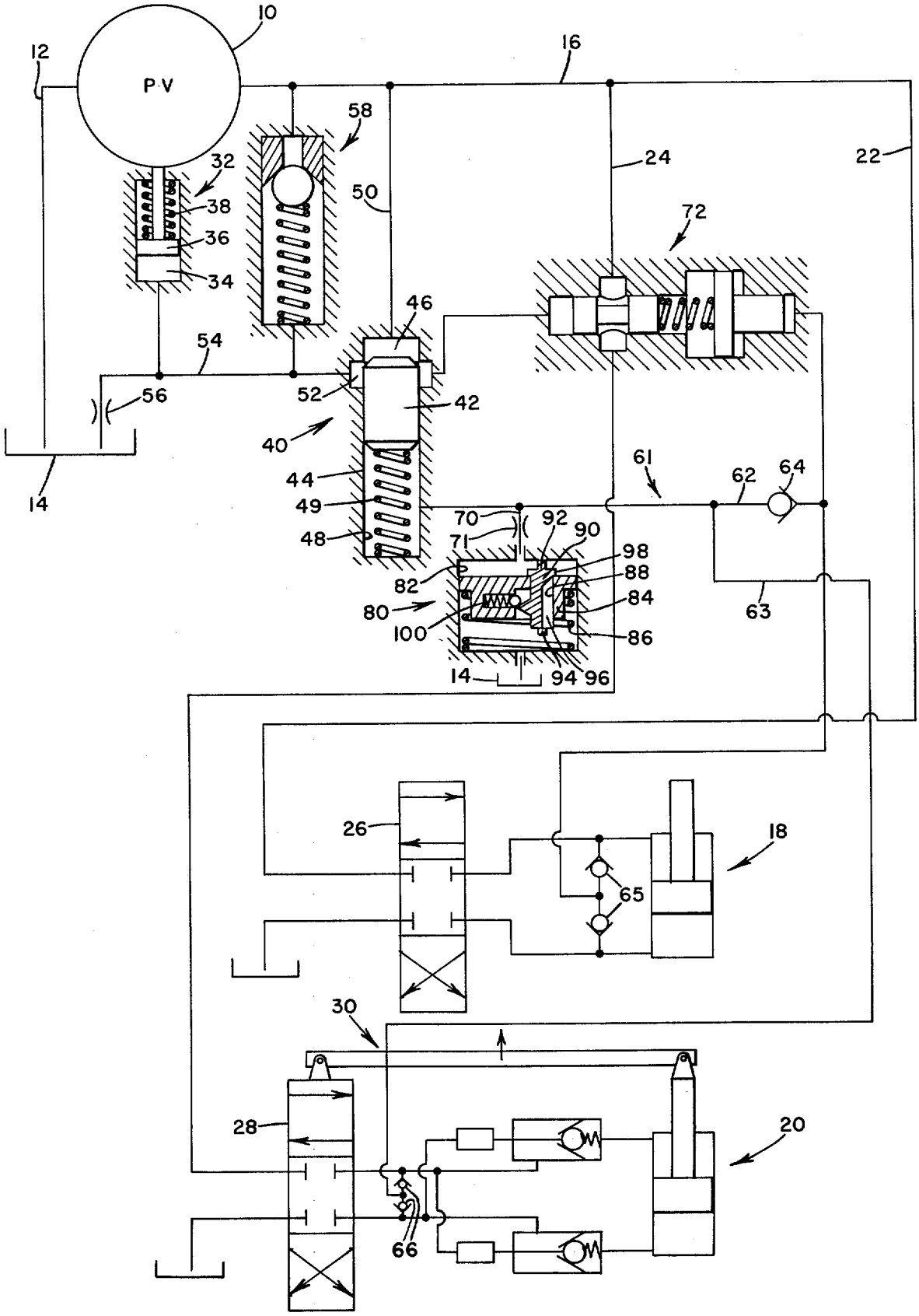
10
12
P.V
16
58
32
38
36
34
50
24
22
72
46
54
56
52
42
40
44
49
48
14
61
62
64
70
92
90
71
98
88
82
84
80
100
86
63
14
94
96
26
18
65
30
28
20
66

DEMAND COMPENSATED HYDRAULIC SYSTEM WITH PILOT LINE DITHER

Matter enclosed in heavy brackets [ ] appears in the original patent but forms no part of this reissue specification; matter printed in italics indicates the additions made by reissue.

BACKGROUND OF THE INVENTION

The invention relates generally to a hydraulic system embodying a demand compensated principle in which the output of a variable displacement pump can be made proportional to the instantaneous load demand of one or more fluid motors powered by the pump and more particularly to a demand compensated hydraulic system which includes a servo motor control valve which controls and is closed by servo feedback from the motor and which further includes a dither to return the variable displacement pump to stand-by as the demand approaches zero.

In the past, demand compensated hydraulic systems with closed loop control of a motor tended to "hang up" at load pressure and not allow the pump to return to the standby condition when the load stopped moving. This was because the internal pressure drop across the servo motor control valve would cause the pressure at the motor to be insufficient to operate the motor to activate the servo mechanism to close the valve and thereby cause the pump to go into the stand-by condition but would be sufficient to feed back through the demand feedback system to prevent the pump from going to the stand-by condition. In this hung up condition, the pump would continue to pump fluid through the demand feedback system resulting in heat buildup in the fluid and power loss due to non-standby operation of the pump.

SUMMARY OF THE INVENTION

The present invention provides an improved demand compensated hydraulic system which includes means to continuously oscillate or dither the pressurized fluid in the demand feedback system to prevent the occurrence of hang ups.

The above and additional advantages of the present invention will become apparent to those skilled in the art from a consideration of the following detailed description of the preferred embodiment when taken in conjunction with the accompanying drawing.

BRIEF DESCRIPTION OF THE DRAWING

The drawing shows schematically and partially in section, the demand compensated system employed with a plurality of motors including a servo valve controlled motor and incorporating the present invention.

DESCRIPTION OF THE PREFERRED EMBODIMENT

The demand compensated hydraulic system shown in the drawing is generally similar to that shown in the Van Gerpen U.S. Pat. No. 2,892,311 for hydraulic apparatus and a more detailed description of the conventional components may be had by reference thereto.

The numeral 10 represents a conventional variable displacement pump having an intake line 12 connected to a reservoir 14 and further having a high pressure output line 16. The output line 16 is connected to a hydraulic system which includes first and second two-way hydraulic motors 18 and 20 which are connected in parallel to the output line 16 respectively by first and second supply branches 22 and 24. A first and a second motor control valves 26 and 28, respectively, are interposed in the supply branches 22 and 24 for selectively causing pressurization of the motors 18 and 20 by the pump 10. Both control valves are shown in their neutral positions. The second control valve 28 includes a servo feedback control device 30 which controls the valve 28 and is responsive to manual input commands as well as to the positioning of the motor 20.

The output of the pump 10 is under the control of a conventional pump output control mechanism 32, here comprising a fluid receivable chamber 34 in which means such as a piston 36 moves in one direction under action of a biasing means in the form of a spring 38 to increase pump output and in the opposite direction to decrease pump output in response to pressurized fluid admitted to the chamber 34 through a conventional demand compensating or demand control valve indicated in its entirety at 40.

The demand control valve 40 comprises a piston 42 which separates a bore 44 into pressure and pilot chambers 46 and 48, respectively, and which is biased toward the pressure chamber 46 by a spring 49. The pressure chamber 46 is connected via a control line 50 to the output line 16 and by a port chamber 52 in the demand control valve 40 to the output control mechanism chamber 34 via a control line 54. The control line 54 further leads via an orifice 56 to the reservoir 14. A conventional relief valve 58 is connected between the lines 16 and 54 to dump excessively pressurized fluid to the line 54 for ultimate exhaust to the reservoir 14 and at the same time afford an instantaneous pressure rise in the chamber 34 for moving the pump out of stroke to decrease the pump output. The pilot chamber 48 of the demand valve means 40 is connected to a feedback or pilot circuit 61 which includes first and second feedback branches 62 and 63. The first feedback branch 62 contains a check valve 64 and is connected to the first supply branch 22 through a check valve assembly 65. The second feedback branch 63 is connected to the second supply branch 24 through a check valve assembly 66. The pilot circuit 61 includes a reservoir line 70 having a restrictor 71 therein connected to the reservoir 14 as will later be described.

A conventional priority valve 72 is interposed in the second supply branch 24 and is connected to the first feedback branch 62 in parallel with the check valve 64. The priority valve 72 is further connected to the port chamber 52 of the demand valve 40. The priority valve 72 opens the second supply branch 24 when the pressure in the chamber 52 is at a predetermined high value and closes the second supply branch 24 when the chamber 52 pressure decreases to a predetermined low value as fully described in the Van Gerpen patent.

A dither 80 includes a chamber 82 connected at one end to the reservoir line 70 and at the other to the reservoir 14. Slidably received within the chamber 82 is a piston 84 biased by a spring 86 towards the reservoir line 70. The piston 84 has a hole 88 therethrough in which a valve member 90 is slidably positioned. The valve member 90 has a protrusion 92 on one end for abutting the restrictor 71 end of the chamber 82 and a protrusion 94 for abutting the reservoir 14 end of the chamber 82. The valve member 90 includes a fluid passage 96 which is blocked from the reservoir end of the chamber 82 when a shoulder 98 of the valve member 90 abuts the piston 84 and will place the reservoir end in fluid communication with the restrictor end when the shoulder 98 does not abut the piston 84. To hold the valve member 90 in the first and second positions, there is provided a conventional spring loaded detent 100 located in the piston 84.

In operation, assuming that both the control valves 26 and 28 are in neutral, the pressure in the output line 16 and in the supply branches 22 and 24 ahead of the control valves 26 and 28 will be determined by the load applied by the spring 49 in the demand control valve 40. Consequently, the port chamber 52 will be open to fluidly connect the control lines 50 and 54 for supplying fluid to the output control mechanism 32. A small, steady flow is supplied, the rate of which is dependent for one thing on the size of the orifice 56. Thus, the pump output is relatively low, being sufficient only to maintain the flow just described at a corresponding pressure which may be considered the "standby" pressure. At this time there will be no flow in the pilot circuit 61, since the control valves 26 and 28 are in neutral and any fluid trapped in the pilot circuit 61 can bleed to the reservoir 14 or just balance the spring 86 in the dither 80.

Upon moving the control valve 28 out of its neutral position so as to establish fluid communication to the motor 20, the system will impose a certain demand on the pump 10. The pressure increases in the feedback branch 63 faster than it can be relieved through the reservoir line 70 and is communicated to the pilot chamber 48 of the demand valve 40 and this pressure, plus the pressure of the spring 49, will cause the piston 42 to close the port chamber 52. Fluid trapped in the line 54 under the pressure of the spring 38 will bleed through the orifice 56 without being made up causing the piston 36 to move to increase the output of the pump 10 and increase the pressure and flow in the output line 16 to satisfy the system demand. As soon as the motor 20 begins to move, the flow through the control valve 28 will incur a pressure drop across its internal metering port and the pressure in the pilot circuit 61 will drop below that of the pressure in the output line 16, with the result that the demand valve spool 42 will uncover the port 52 to add further fluid to the chamber 34 and thus to hold pump output at that signal by the system demand.

As fluid flows through the reservoir line 70 and the restrictor 71, the pressure will first be insufficient to overcome the spring load of the spring 86 and thus the piston 84 will be positioned with valve member 90 closed. As the pressure builds up, the piston 84 will be forced towards the reservoir end of the chamber 82 and will compress the spring 86. Upon reaching a predetermined pressure, the protrusion 94 of the valve member 90 will abut the reservoir end of the chamber 82 causing the valve member 90 to be pushed past the detent means 100 to the second position wherein the fluid passage 96 of the valve member 90 will offer fluid communication between the restrictor and the reservoir ends of the chamber 82. The fluid passage 96 is sized so as to present substantially minimal resistance to fluid flow from one end of the chamber to the other which causes the piston 84 to be urged by the spring 86 against the restrictor end of the chamber. When the protrusion 92 abuts the restrictor end of the chamber the valve member 90 is pushed back past the detent means 100 to block fluid communication and allow buildup of pressure again. While there is pressurized fluid in the pilot circuit 61, the piston 84 will continue to oscillate or dither from one end of the chamber 82 to the other causing momentary pressure pulsations in the pilot chamber 48.

As the hydraulic motor 20 approaches its desired position, the servo feedback mechanism 30 causes the direction control valve 28 to move towards its neutral position. As the valve 28 approaches its neutral position, the pressure drop across its internal metering port reaches a point where insufficient pressure can be supplied to the fluid motor 20 to move the fluid motor 20 to completely close the valve 28. In this position the valve 28 has sufficient flow across the metering port, however, to pressurize the demand control valve 40 through the pilot circuit 61.

As this condition is approached and the pressure builds up in the pilot circuit 61, the piston 84 in the dither 80 is moved to the position wherein the valve member 90 suddenly opens to release the fluid pressure in the pilot circuit 61. With the sudden release of pressure, the demand control valve 40 opens to cause the pump 10 to decrease its output pressure to the stand-by level and the flow in the supply branch 24 is stopped which feeds back through the pilot circuit 61 to cause standby operation of the pump 10. Thus, the dither 80 prevents occurrence of the situation wherein the flow across the control valve is sufficient to prevent the pump from going to a standby condition while being insufficient to operate the function to close the valve to cause the pump to go into the standby condition.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. An improved hydraulic system of the type having a variable displacement pump with output control means biased to increase pump output and responsive to an input of pressurized fluid to decrease pump output, a fluid motor, an output line connected between the pump and the motor, a motor control valve interposed in the output line and having servo feedback from the motor for selectively opening and closing the output line, a control line connected between the pump and the output control means, demand valve means interposed in the control line for selectively opening and closing the control line to allow and block the input of pressurized fluid to the output control means in response to pressurized fluid in a pilot line connected to the demand valve means, said pilot line [further connected to the output line between] *operatively associated with* the motor control valve and *pressurized by the pressurized fluid to* the motor *when the motor control valve is moved from a neutral position,* wherein the improvement comprises: means operatively associated with the pilot line responsive to pressurized fluid therein to cause fluctuations in the pressure of the pressurized fluid.

2. An improved hydraulic system of the type having a variable displacement pump with output control means biased to increase pump output and responsive to an input of pressurized fluid to decrease pump output, a fluid motor, an output line connected between the pump and the motor, a motor control valve interposed in the output line and having servo feedback from the motor for selectively opening and closing the output line, a control line connected between the pump and the output control means, demand valve means interposed in the control line for selectively opening and closing the control line to allow and block the input of pressurized fluid to the output control means in response to pressurized fluid in a pilot line connected to the demand valve means, said pilot line [further connected to the output line between] *operatively associated with* the motor control valve and *pressurized by the pressurized fluid to* the motor *when the motor control valve is moved from a neutral position,* and a restricted reservoir line connecting the pilot line to a fluid reservoir, wherein the the improvement comprises: dither means interposed between the restricted reservoir line and the fluid reservoir responsive to pressurized fluid in the restricted reservoir line for cyclically connecting and blocking the restricted reservoir line to and from the reservoir whereby pulsations are caused in the pressurized fluid in the pilot line.

3. An improved hydraulic system of the type having a variable displacement pump with output control means biased to increase output and responsive to an input of pressurized fluid to decrease pump output, a fluid motor, an output line connected between the pump and the motor, a motor control valve interposed in the output line and having servo feedback from the motor for selectively opening and closing the output line, a control line connected between the pump and the output control means, demand valve means interposed in the control line for selectively opening and closing the control line to allow and block the input of pressurized fluid to the output control means in response to pressurized fluid in a pilot line connected to the demand *valve* means, said pilot line [further connected to the output line between] *operatively associated with* the motor control valve and *pressurized by the pressurized fluid to* the motor *when the motor control valve is moved from a neutral position,* connecting the pilot line to a fluid reservoir, and a restrictor interposed in the reservoir line, wherein the improvement comprises: dither means interposed between the reservoir line and the reservoir; said dither means having a chamber therein in fluid communication through the reservoir line with the pilot line at one end and with the reservoir at the other end; said dither means including piston means positioned in the chamber and biased towards the pilot line end of the chamber and slidable under a predetermined fluid pressure to the reservoir end of the chamber, said piston means including valve means responsive to positioning at the pilot line end and at the reservoir end of the chamber to respectively block and allow fluid communication between the pilot line and reservoir ends of the chamber.

4. The hydraulic system as claimed in claim 3 wherein the dither means includes detent means operatively associated with the valve means for maintaining fluid communication between the pilot line end and the reservoir end of the chamber during movement of the piston means from the reservoir end and the pilot line end of the chamber and for maintaining blocking of fluid communication between the pilot line end and reservoir end of the chamber during movement of the piston means from the pilot line end to the reservoir end of the chamber.

5. An improved hydraulic system of the type having a variable displacement pump with output control means biased to increase pump output and responsive to an input of pressurized fluid to decrease pump output, a fluid motor, an output line connected between the pump and the motor, a motor control valve interposed in the output line and having servo feedback from the motor for selectively opening and closing the output line, a control line connected between the pump and the output control means, demand valve means interposed in the control line for selectively opening and closing the control line to allow and block the input of pressurized fluid to the output control means in response to pressurized fluid in a pilot line connected to the demand valve means, said pilot line further connected to the output line between the motor control valve and the motor, a reservoir line connecting the pilot line to a fluid reservoir, and a restrictor interposed in the reservoir line, wherein the improvement comprises: dither means interposed between the reservoir line and the reservoir; said dither means having a chamber therein closed at the ends with the pilot line through the reservoir line in fluid communication with one end of the chamber and the reservoir in fluid communication with the other end of the chamber; said dither means including a piston positioned in the chamber and dividing the chamber into a pilot line connected chamber and a reservoir connected chamber, said piston slidable towards the reservoir connected chamber in response to pressurized fluid in the pilot line; said dither means having biasing means therein urging the piston towards the pilot line connected chamber; said piston having an opening therethrough and including valve means protruding through said opening, said valve means slidable in the piston upon abutting the pilot line end of the chamber to an open position wherein the pilot line and reservoir connected chambers are in fluid communication whereby the pressure to the demand valve means is decreased and slidable in the piston upon abutting the reservoir end of the chamber to a closed position wherein the pilot line and reservoir connected chambers are blocked from fluid communication to increase fluid pressure in the pilot line.

6. The hydraulic system as claimed in claim 5 wherein the piston includes detent means operatively associated with the valve means to hold the valve means in the open position after the valve means abuts the pilot line end of the chamber and to hold the valve means in the closed position after the valve means abuts the reservoir end of the chamber.

* * * * *